No. 641,319. Patented Jan. 16, 1900.
J. PARBEL.
NUT AND BOLT LOCK.
(Application filed Nov. 29, 1898.)
(No Model.)
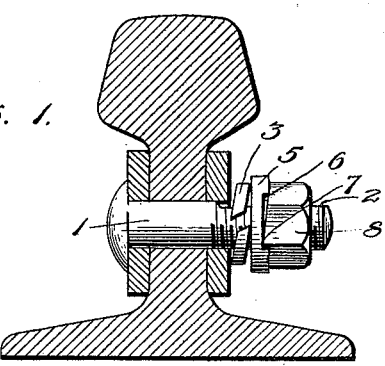
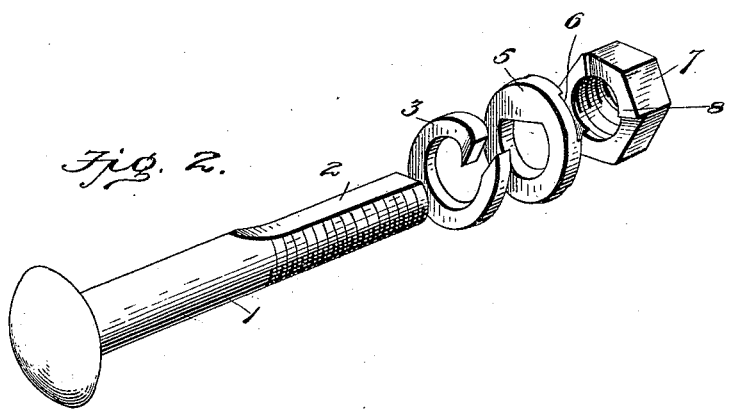
Witnesses
Inventor
Joseph Parbel
by H. B. Wilson & Co
Attorneys

UNITED STATES PATENT OFFICE.

JOSEPH PARBEL, OF GRAND RAPIDS, MICHIGAN.

NUT AND BOLT LOCK.

SPECIFICATION forming part of Letters Patent No. 641,319, dated January 16, 1900.

Application filed November 29, 1898. Serial No. 697,808. (No model.)

*To all whom it may concern:*

Be it known that I, JOSEPH PARBEL, a citizen of the United States, residing at Grand Rapids, in the county of Kent and State of Michigan, have invented certain new and useful Improvements in Nut and Bolt Locks; and I do declare the following to be a full, clear, and exact description of the invention, such as will enable others skilled in the art to which it appertains to make and use the same.

The invention relates to nut and bolt locks; and the object is to provide a device of this character which shall be simple of construction, durable in use, and comparatively inexpensive of production, and which when locked cannot be unlocked without breaking one or more of the parts.

To this end the invention consists in certain features of construction and combination of parts, which will be hereinafter fully described, and particularly pointed out in the appended claim.

In the drawings, Figure 1 is a cross-sectional view through the end of a railroad-rail, its fish-plates, and the nut and bolt lock, showing the parts locked. Fig. 2 is a perspective view of the bolt, spring-washer, the rigid washer, and the nut, showing them separated.

Referring to the accompanying drawings, 1 denotes the bolt, having a portion thereof cut away to form a flat surface 2.

3 denotes the spring-washer, adapted to be placed upon the bolt against the fish-plate. This washer is split and has its ends bearing and projecting in opposite directions.

5 denotes the rigid washer, the aperture of which corresponds to the shape of the bolt in cross-section, so that there will be no independent movement of the bolt and washer. The outer face of the rigid washer is provided with notches 6, which receive the correspondingly-shaped lugs 8 on the inner face of the nut 7, which is screwed on the bolt. It is evident that when this nut is screwed firmly home the split washer will be compressed between the fish-plate and the rigid washer, so that its ends will lie in the same plane, and it will be absolutely impossible for the nut to become loosened, for the reason that the lugs on the nut are seated in the recesses of the rigid washer, and the rigid washer being nonrotatable the spring-washer will have to be broken and removed in order to permit of the rigid washer being moved inwardly free from the nut before the nut can be unscrewed from the bolt.

Having thus described my invention, what I claim, and desire to secure by Letters Patent, is—

In a nut and bolt lock, the combination of the bolt having a portion thereof cut away along its threaded part to form a flat surface; the split spring-washer having its spring ends projecting and bearing in opposite directions; the rigid washer having its aperture corresponding in outline to the cut-away portion of the bolt in cross-section, and provided in its outer face with notches; and the nut provided on its inner face with lugs corresponding with and formed to fit the notches of said rigid washer, and adapted to be turned upon the threaded portion of the bolt to cause the ends of the spring-washer to engage opposed bearing-points and lie in the same plane, substantially as specified.

In testimony whereof I have hereunto set my hand in presence of two subscribing witnesses.

JOSEPH PARBEL.

Witnesses:
PETER J. ALFLEN,
PETER C. SHICKELL.